(No Model.)
2 Sheets—Sheet 1.

F. E. DAVIS.
CULTIVATOR.

No. 568,524.
Patented Sept. 29, 1896.

Witnesses,
T. S. Mann
Frederick F. Goodrum

Inventor,
Frank E. Davis
By Offield, Towle & Linthicum
Attys.

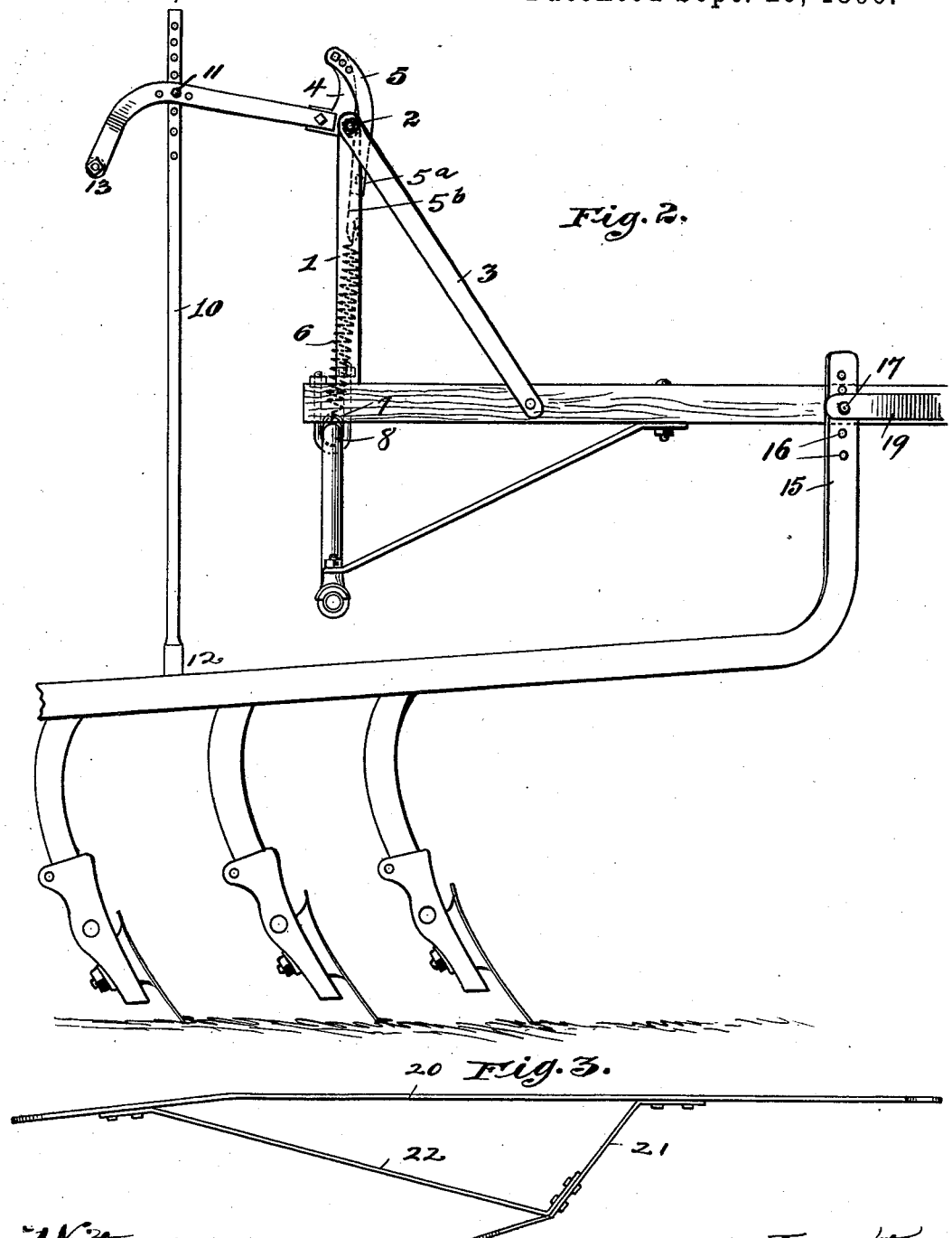

UNITED STATES PATENT OFFICE.

FRANK E. DAVIS, OF LA CROSSE, WISCONSIN.

CULTIVATOR.

SPECIFICATION forming part of Letters Patent No. 568,524, dated September 29, 1896.

Application filed August 20, 1895. Serial No. 559,933. (No model.)

*To all whom it may concern:*

Be it known that I, FRANK E. DAVIS, a citizen of the United States, residing at La Crosse, Wisconsin, have invented a certain new and useful Improvement in Cultivators, of which the following is a specification.

This invention relates to that class of cultivators in which the shovel-beams are pivoted at their forward ends to the tongue-frame and are also connected through the intervention of standards, pivoted levers, and springs to the wheel-frame, so that the beams are spring-supported.

This invention relates more particularly to certain improvements in the construction and arrangement of these connections and in the construction and arrangement of the shovel-beams themselves and in their connection to the tongue-frame.

Figure 1:
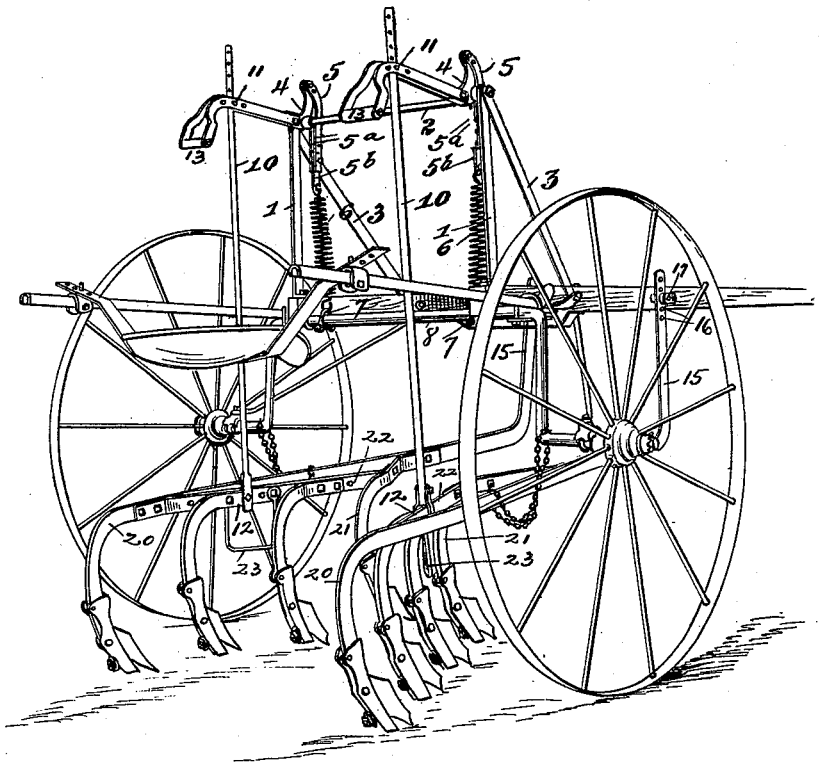
Figure 4:
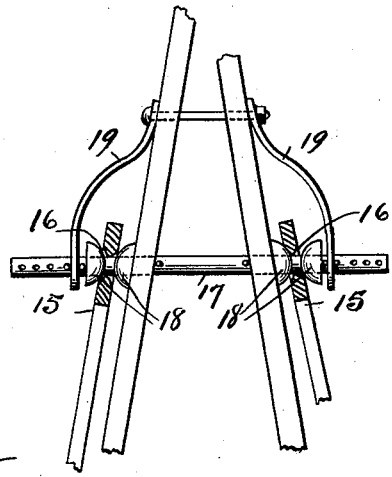

In the accompanying drawings, Figure 1 is a perspective view, and Fig. 2 is a side elevation, of parts of a cultivator embodying my improvement. Fig. 3 is a detail view in plan of the shovel beam; and Fig. 4 is a detail plan view of the same at its forward end, showing the manner of connecting it to the tongue-frame.

The wheels, axle, and tongue-frame are of the usual construction and need not be particularly described. Upon the rear ends of the side members of the tongue-frame are secured rigidly the upright standards 1, which are connected at their upper ends by the cross-bar, rod, or shaft 2, the latter having its extremities threaded and passing through apertures in the upper ends of the standards 1 and through like apertures in the upper ends of the diagonal braces 3, whose lower ends are connected to the tongue-frame. Pivotally mounted upon the cross-bar 2 are the elbow or bell-crank levers 4, whose short arms curve upwardly and rearwardly. To these curved ends are connected the links 5, the links preferably being formed of three straps, the upper members of which are marked 5ª and the lower members 5ᵇ. The members 5ª have a series of holes at each end, so that they may be connected in different positions to the elbow-levers and to an extension-spring 6, the lower end of which spring is shackled by the clevis 7 to the crank 8 of the axle. The tension of the spring may be varied by changing its point of connection to the link. The rear ends of the elbow-levers 4 are preferably formed of straps which are perforated transversely and slightly separated from each other to embrace the rods 10, which latter are adjustably secured to the elbow-levers by pins 11, passing through the perforations of the elbow-levers and transverse apertures in the rods. The lower ends of these rods are connected to the shovel-frame 12 either pivotally or rigidly, as preferred. The extremities of the elbow-levers 4 are spread and connected by the handle-piece 13, making a convenient means of grasping and manipulating said levers.

The shovel-beams are connected at their forward ends to the curved drag-bars 15, and the latter have in their upper ends a series of apertures 16, through which the rod 17 passes, said rod passing through apertures in the tongue-frame. Round-sided washers 18 are slipped over the rod and confined against each side of the upper ends of the drag-bars by keys. A draw-strap 19 has its front end secured to the tongue-frame and its rear end apertured to take over the rod 17. By extending the rod 17 and shifting the washers thereon the front ends of the drag-bars may be adjusted to or from each other, as desired.

The shovel-frame consists of three bars, the outer one of which is marked 20 and carries the rear shovel. The inner one is marked 21 and carries the front shovel, while the diagonal member 22 has its ends secured to the members 20 and 21 and carries one or more intermediate shovels. This arrangement of the members of the shovel-frame makes it exceedingly strong and rigid. By providing member 22 with a series of apertures the cultivator may be arranged with two, three, or more shovels to each frame, thus making it readily adjustable to the needs of the farmer with but slight expense of time in making the required changes.

It will be observed that in my construction I have dispensed with separate hand-levers for operating the pivoted bell-cranks and have provided said bell-cranks themselves with handles, by means of which they may be operated.

It will further be observed that the standards are rigidly connected to the frame, while the rods which connect the bell-crank to the shovel-beams are necessarily pivoted only at one end.

The operation of the construction above described and the objects attained thereby may be briefly stated as follows: When the shovels are in the working position, as shown in Fig. 1 of the drawings, the links and springs stand practically in a vertical plane and the curved links are in contact with the hubs of the bell-cranks, thus preventing any further descent of the shovels except by such added pressure as would cause the links to rock over said hubs as a fulcrum and thus deflect the springs, and when such added pressure is removed the springs will immediately bring the shovel-beams back to normal position. Upon the application of sufficient force to rock the bell-cranks on their pivots and thereby carry their pivotal connections with the link in front of a plane passing through the point of connection of the springs to the frame and the point of contact of the links with the hubs of the bell-cranks the springs immediately begin to lift upon the shovel-beams through the bell-crank levers and the connecting-rods 10, thus assisting to raise the shovels out of the ground and maintaining them in the elevated position. By varying the connections between the rods and the rear ends of the bell-cranks or by varying the connections between the links and the front ends of the bell-cranks, or both, a wide range of adjustment may be secured, and by these adjustments the springs may be so arranged as to exert a constant lifting effect upon the shovel-beams. Therefore, while the arrangement and construction of parts above described provides a lock which may be utilized in all cases, the locking position will vary with the various adjustments and may be so slight as to require but little force to move the parts out of the locking position, or may be made rigid, so as to require exertion of considerable force to break the lock. The springs have therefore a twofold object. They permit the shovels to be forced deeper into the earth by pressure upon the shovel-beams and they also assist to raise the shovel-beams when the shovels are lifted out of the ground.

I claim—

1. In a cultivator of the class described, the combination with the wheel-frame of vertically-vibrating shovel-beams, rigid uprights mounted on the wheel-frame, bell-cranks pivotally mounted upon said uprights, rods pivotally connecting the shovel-frames and the rear ends of the bell-cranks and springs and links pivotally connecting the front ends of the bell-cranks with the wheel-frame, substantially as described.

2. In a cultivator of the class described, the combination of a wheel-frame, shovel-beams pivotally connected thereto and adapted to vibrate vertically, standards mounted on the wheel-frame, bell-cranks, or elbow-levers, pivoted upon said standards, rods pivotally connecting the rear ends of said bell-cranks with the shovel-frame, extension-springs secured at their lower ends to the axle and links adjustably connecting the upper ends of said springs with the forward ends of the bell-cranks, substantially as described.

3. In a cultivator of the class described, the combination with a wheel-frame, of vertically-vibrating shovel-beams pivotally connected thereto, standards or uprights mounted on the wheel-frame, a cross-rod connecting the upper ends of said standards, bell-cranks pivotally mounted upon said cross-rod and having their forward ends upwardly curved, rods pivotally and adjustably connecting the rear ends of said bell-cranks with the shovel-frame, springs connected at their lower ends to the axles and curved links connecting the curved ends of the bell-cranks with the upper ends of said springs, said curved links constituting locks for the moving parts, substantially as described.

4. In a cultivator of the class described, the combination with a wheel-frame, of shovel-beams pivotally connected thereto in front of the axle, uprights rigidly connected with the wheel-frame substantially in the plane of the axle, bell-cranks mounted pivotally on said uprights, rods connecting the rear ends of said bell-cranks with the shovel-beams and the rear of the axle, springs connected to the wheel-frame and to the front ends of the bell-cranks and the latter having their rear ends constructed to provide operating-handles, substantially as described.

5. The combination with the drag-bars of a cultivator, of a draft-rod passing through apertures in said drag-bars, and washers on said rod and having rounded sides confined in contact with the drag-bars whereby to prevent lateral movement thereof on the rods, while permitting lateral vibration, substantially as described.

FRANK E. DAVIS.

Witnesses:
C. C. LINTHICUM,
FREDERICK C. GOODWIN.